United States Patent
Abiko

(10) Patent No.: US 7,362,888 B2
(45) Date of Patent: Apr. 22, 2008

(54) LIVING-BODY DETECTING APPARATUS AND METHOD, AND AUTHENTICATING APPARATUS HAVING LIVING-BODY DETECTING FUNCTION

(75) Inventor: Yukihiro Abiko, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 8 days.

(21) Appl. No.: 11/036,390

(22) Filed: Jan. 18, 2005

(65) Prior Publication Data
US 2005/0123177 A1 Jun. 9, 2005

Related U.S. Application Data

(63) Continuation of application No. PCT/JP02/09467, filed on Sep. 13, 2002.

(51) Int. Cl.
*G06K 9/00* (2006.01)

(52) U.S. Cl. .................. 382/124; 356/71; 382/209

(58) Field of Classification Search ........... 340/5.83; 382/124, 125, 126, 115, 209; 356/71
See application file for complete search history.

(56) References Cited

U.S. PATENT DOCUMENTS

| | | | |
|---|---|---|---|
| 4,682,608 A * | 7/1987 | De Rigal et al. | 600/587 |
| 5,177,802 A | 1/1993 | Fujimoto et al. | 382/4 |
| 5,416,573 A * | 5/1995 | Sartor, Jr. | 356/71 |
| 5,757,278 A * | 5/1998 | Itsumi | 340/5.83 |
| 6,144,757 A | 11/2000 | Fukuzumi | |
| 6,228,029 B1 * | 5/2001 | Eccardt et al. | 600/437 |
| 6,558,050 B1 * | 5/2003 | Ishibashi | 396/420 |
| 6,643,389 B1 * | 11/2003 | Raynal et al. | 382/124 |
| 6,647,133 B1 | 11/2003 | Morita et al. | 382/124 |
| 6,845,173 B2 * | 1/2005 | Takahashi | 382/124 |
| 6,872,916 B2 * | 3/2005 | Carver et al. | 219/201 |
| 6,876,757 B2 * | 4/2005 | Yau et al. | 382/125 |
| 6,961,452 B2 | 11/2005 | Fujii | |
| 6,980,669 B1 | 12/2005 | Uchida | |
| 2003/0035569 A1 * | 2/2003 | Chau | 382/124 |
| 2005/0090800 A1 * | 4/2005 | Smith et al. | 604/500 |
| 2005/0123177 A1 * | 6/2005 | Abiko | 382/124 |
| 2005/0179761 A1 * | 8/2005 | Tomaru | 347/106 |
| 2007/0003114 A1 * | 1/2007 | Hendriks et al. | 382/124 |

(Continued)

FOREIGN PATENT DOCUMENTS

EP 1139271 10/2001

(Continued)

*Primary Examiner*—Gregory M Desire
(74) *Attorney, Agent, or Firm*—Staas & Halsey LLP

(57) ABSTRACT

The present invention provides an authenticating apparatus for employing a living-body such as, for example, a fingerprint and a palm print, thereby to make personal authentication, and for purpose of allowing a detection as to whether or not a subject is a living-body to be made securely, thus making it possible to securely identify a non-living body such as, for example, an artificial finger made of gummi, the apparatus comprises and is configured of: an image obtaining means for continuously obtaining images of an integument surface of the living-body, which moves while touching an obtaining plane; and a secretion product detecting means for detecting existence of a secretion product to be secreted from an exocrine gland of the integument surface of the living-body, based upon a plurality of the images obtained continuously by this image obtaining means.

19 Claims, 5 Drawing Sheets

U.S. PATENT DOCUMENTS

2007/0160263 A1 * 7/2007 Abiko et al. ............... 382/115

FOREIGN PATENT DOCUMENTS

| EP | 1139271 A2 * | 10/2001 |
|---|---|---|
| EP | 1530949 A1 * | 5/2005 |
| GB | 2148513 A * | 5/1985 |
| JP | 2-1243 | 1/1990 |
| JP | 4-190470 | 7/1992 |
| JP | 9-259272 | 10/1997 |
| JP | 10-240942 | 9/1998 |
| JP | 10-302047 | 11/1998 |
| JP | 2000-123143 | 4/2000 |
| JP | 2000-172833 | 6/2000 |
| JP | 2000-194848 | 7/2000 |
| JP | 2000-201907 | 7/2000 |
| JP | 2000201907 A * | 7/2000 |
| JP | 2001-5972 | 1/2001 |
| JP | 2001-167053 | 6/2001 |
| JP | 2001-307078 | 11/2001 |
| JP | 2001-344604 | 12/2001 |
| JP | 2002-236666 | 8/2002 |
| WO | 01/09816 | 2/2001 |
| WO | 01/24700 | 4/2001 |
| WO | WO 2004023999 A1 * | 3/2004 |

* cited by examiner

TIME T

TIME T+t

TIME T+k

LIVING-BODY DETECTING APPARATUS AND METHOD, AND AUTHENTICATING APPARATUS HAVING LIVING-BODY DETECTING FUNCTION

This application is a continuation application, filed under 35 USC 111(a), of International Application PCT/JP2002/009467, filed Sep. 13, 2002.

BACKGROUND OF THE INVENTION

1) Field of the Invention

The present invention relates to an apparatus and a method of detecting whether or not a subject of which biometric information should be acquired is a living body in an authenticating apparatus for employing biometric information such as, for example, a fingerprint, a palm print, and a blood vessel pattern, thereby to make personal authentication.

Also, the present invention relates to an authenticating apparatus for employing biometric information such as, for example, a fingerprint, a palm print, and a blood vessel pattern, thereby to make personal authentication, and more particularly to an authenticating apparatus having a living-body detecting function for detecting whether or not a subject, being an object of biometric information acquisition, is a living body in acquiring biometric information from a person to be authenticated.

2) Description of the Related Art

Small-sized information appliances such as a mobile telephone and a PDA (Personal Digital Assistant) have been allowed to be connected to a network in some cases, or to file a large capacity of personal information etc. in some cases, accompanied by their highly-developed functions of recent years, and a demand for improving a security performance in these appliances have been augmented exceedingly.

So as to insure a security in such appliances, it can be thought to employ personal authentication by means of a password or an ID (Identification) card etc. which haven been widely used hitherto. The password or the ID card, however, has a high risk of being stolen, so realization of personal authentication with a higher reliability (authenticating that an appliance's user is a pre-registered user) has been strongly requested. For such a request, it is believed that the personal authentication by means of biometric information has a high reliability and can respond to the foregoing request. In particular, its convenience is also high in a case of employing a fingerprint as biometric information.

In a case of employing the fingerprint as biometric information, thereby to make personal authentication, the fingerprint (a pattern which is comprised of ridges, which can touch an obtaining plane of a fingerprint sensor, and valleys, which do not touch the identical obtaining plane) is obtained as image information from a finger of a person to be authenticated with a capacitance type fingerprint sensor or an optical fingerprint sensor. And, characteristic information (for example, position information of bifurcations or end-points) is extracted from the foreground (for example, ridge images) of its fingerprint image to compare the extracted characteristic information with registered characteristic information of a person to be authenticated, which was pre-registered, and thereby to make a determination as to whether or not the person to be authenticated is a person who has performed the registration of the registered characteristic information, that is, personal authentication.

By the way, in a system in which the fingerprint is employed to make personal authentication as described above, unjust utilization employing a forged fingerprint has been pointed out as one of the problems upon making personal authentication having a high reliability. That is, in a system of employing the fingerprint, there is the possibility that a finger having the forged fingerprint is artificially fabricated to make successful impersonation employing its artificial finger, and the unjust utilization by an act of its successful impersonation might incur degradation in a reliability of the system.

In a case where silicon or rubber was employed as a material of the artificial finger, it is impossible to make the unjust utilization as described above, because these materials are impervious to electricity, so the capacitance type fingerprint sensor has no operation of obtaining the fingerprint images from an artificial finger made of silicon or an artificial finger made of rubber. Also, the optical fingerprint sensor as well is not able to obtain the fingerprint image basically from the artificial finger made of silicon or the artificial finger made of rubber.

However, it has been pointed out that employing gummi (which is obtained by gelling aqueous solution of gelatin), of which the composition is extremely akin to that of the integument of a human being, as a material of the artificial finger allows the capacitance type fingerprint sensor or the optical fingerprint sensor to obtain the fingerprint image from the artificial finger made of gummi because the gummi is pervious to electricity, thus enabling the unjust utilization by an action of the successful impersonation.

The technologies for excluding the unjust utilization by the forged fingerprint were disclosed, for example, in Japanese Patent Laid-open (Kokai) No. 2000-123143, Japanese Patent Laid-open (Kokai) No. HEI 10-302047, Japanese Patent Laid-open (Kokai) No. HEI 2000-194848, Japanese Patent Laid-open (Kokai) No. 2000-172833, etc.

However, in the technologies disclosed in Japanese Patent Laid-open (Kokai) No. 2000-123143 or Japanese Patent Laid-open (Kokai) No. HEI 10-302047, it is determined whether or not the subject is a living body by means of an electric current value, an electrostatic capacity, an electric resistance, etc. of the subject, so it is impossible to exclude the forged fingerprint of the artificial finger made of gummi which is pervious to electricity as described above. Also, the forged fingerprint is determined by whether or not the capacitance type sensor makes a reaction in the technology disclosed in Japanese Patent Laid-open (Kokai) No. HEI 10-370295, and the forged fingerprint is determined by a frequency characteristic of impedance, being an electric characteristic, in the technology disclosed in Japanese Patent Laid-open (Kokai) No. 2000-172833, so it is impossible for either of these technologies to exclude the forged fingerprint of the artificial finger made of gummi which is pervious to electricity.

The present invention has been originated in consideration of such problems, and a first object thereof is to provide a living-body detecting apparatus and method allowing a detection as to whether or not the subject is a living body to be made securely, thus making it possible to securely identify a non-living body such as, for example, the artificial finger made of gummi.

Also, the present invention has a second object of providing an authenticating apparatus having a living-body detecting function which allows a detection as to whether or not the subject, being an object of biometric information acquisition, is a living body to be made securely in acquiring biometric information from a person to be authenticated for purposes of employing biometric information such as, for example, a fingerprint and a palm print, thereby to make personal authentication, securely identifies, for example, the artificial finger made of gummi, securely excludes the unjust utilization by an action of successful impersonation employing the forged fingerprint, and realizes personal authentication having a higher reliability.

SUMMARY OF THE INVENTION

So as to accomplish the above-mentioned objects, the living-body detecting apparatus of the present invention comprises and is configured of: an image obtaining means for continuously obtaining images of an integument surface of a subject, which moves while touching an obtaining plane; and a secretion product detecting means for detecting existence of a secretion product to be secreted from an exocrine gland of the integument, based upon a plurality of the images obtained continuously by the image obtaining means.

Also, the living-body detecting method of the present invention comprises: an image obtaining step of continuously obtaining images of an integument surface of a subject, which moves while touching an obtaining plane of an image obtaining means, by the image obtaining means; and a secretion product detecting step of detecting a secretion product to be secreted from an exocrine gland of the integument, based upon a plurality of the images obtained continuously in the image obtaining step.

Further, the authenticating apparatus having a living-body detecting function of the present invention comprises: an image obtaining means for continuously obtaining images of an integument surface of a person to be authenticated, which moves while touching an obtaining plane; a secretion product detecting means for detecting existence of a secretion product to be secreted from an exocrine gland of the integument, based upon a plurality of the images obtained continuously by the image obtaining means; a comparing means for comparing obtained characteristic information of the person to be authenticated, which is obtained from a plurality of the images obtained continuously by the image obtaining means, with registered characteristic information of the person to be authenticated, which was pre-registered, thereby to determine whether or not the obtained characteristic information coincides with the registered characteristic information; and an authenticating means for, in a case where existence of the secretion product was detected by the secretion product detecting means and yet it was determined by the comparing means that the obtained characteristic information coincided with the registered characteristic information, authenticating the person.

Additionally, in the image obtaining means or the image obtaining step, a pattern formed on the integument, which is comprised of ridges which can touch the obtaining plane, and valleys which do not touch the obtaining plane, may be obtained together with the secretion product, which adheres to the obtaining plane, as an image of the integument surface. At this time, in the secretion product detecting means or in the secretion product detecting step, a weighted average image of a plurality of the images to be obtained continuously by the image obtaining means may be calculated to detect existence of the secretion product, based upon a temporal change in the calculated weighted average image, and in this case, a change in a sensitivity value accompanied by a lapse of time in the weighted average image may be employed to recognize its change part as a part to which the secretion product adheres, in the discretion plane, thereby to detect existence of the secretion product.

Also, a contact type semiconductor sensor, which is typified by a capacitance type sensor, or an optical sensor may be employed as the image obtaining means. Further, the pattern may be a fingerprint and yet the exocrine gland may be a sweat gland, and in this case, a sweep type fingerprint sensor for, while moving a finger (finger of the person to be authenticated) as the subject relatively to the obtaining plane, obtaining partial images of the fingerprint of the finger continuously may be employed as the image obtaining means.

In accordance with the living-body detecting apparatus and method of the present invention described above, attention is paid to the fact that no exocrine gland (sweat gland) which secretes the secretion products such as sweat, sebum, and vapor exists in the non-living body such as the artificial finger made of gummi, presence of the secretion product which, as long as the living body is concerned, is inevitably secreted from the exocrine gland of its integument is investigated, based upon a plurality of the images obtained continuously by the image obtaining means, and it is detected that the subject is a living body in a case where existence of the secretion product was detected. This makes it possible to securely detect whether or not the subject is a living body, thus allowing the non-living body such as, for example, the artificial finger made of gummi to be identified securely.

Also, in accordance with the authenticating apparatus having a living-body detecting function of the present invention described above, in acquiring biometric information from a person to be authenticated for purposes of employing biometric information such as, for example, a fingerprint, a palm print, and a blood vessel pattern, thereby to make personal authentication, the technique similar to that of the foregoing living-body detecting apparatuses and methods is employed to investigate presence of the secretion product, and the person is authenticated in a case where existence of the secretion product was detected and yet it was determined that the obtained characteristic information coincided with the registered characteristic information. This makes it possible to securely detect whether or not the subject, being an object of biometric information acquisition, is a living body, to securely identify, for example, the artificial finger made of gummi, to securely exclude the unjust utilization by an action of successful impersonation employing the forged fingerprint, and to realize personal authentication having a higher reliability.

At this time, in accordance with the authenticating apparatus of the present invention, the living-body detection can be made by employing the existing image obtaining means for obtaining biometric information as it stands, whereby there is no necessity for newly adding appliances (hardware) for making the living-body detection, and the living-body detecting function can be realized without incurring an increase in facility cost etc.

BRIEF DESCRIPTION OF THE DRAWINGS

FIG. 2(A) to FIG. 2(C) are views illustrating examples of partial images to be obtained by a sweep type finger sensor respectively, and FIG. 2(D) is a view illustrating a weighted average image (superposed image) of the partial images shown in FIG. 2(A) to FIG. 2(C);

DESCRIPTION OF THE PREFERRED EMBODIMENTS

Embodiments of the present invention will be explained below, by making a reference to the accompanied drawings.

Figure 1:
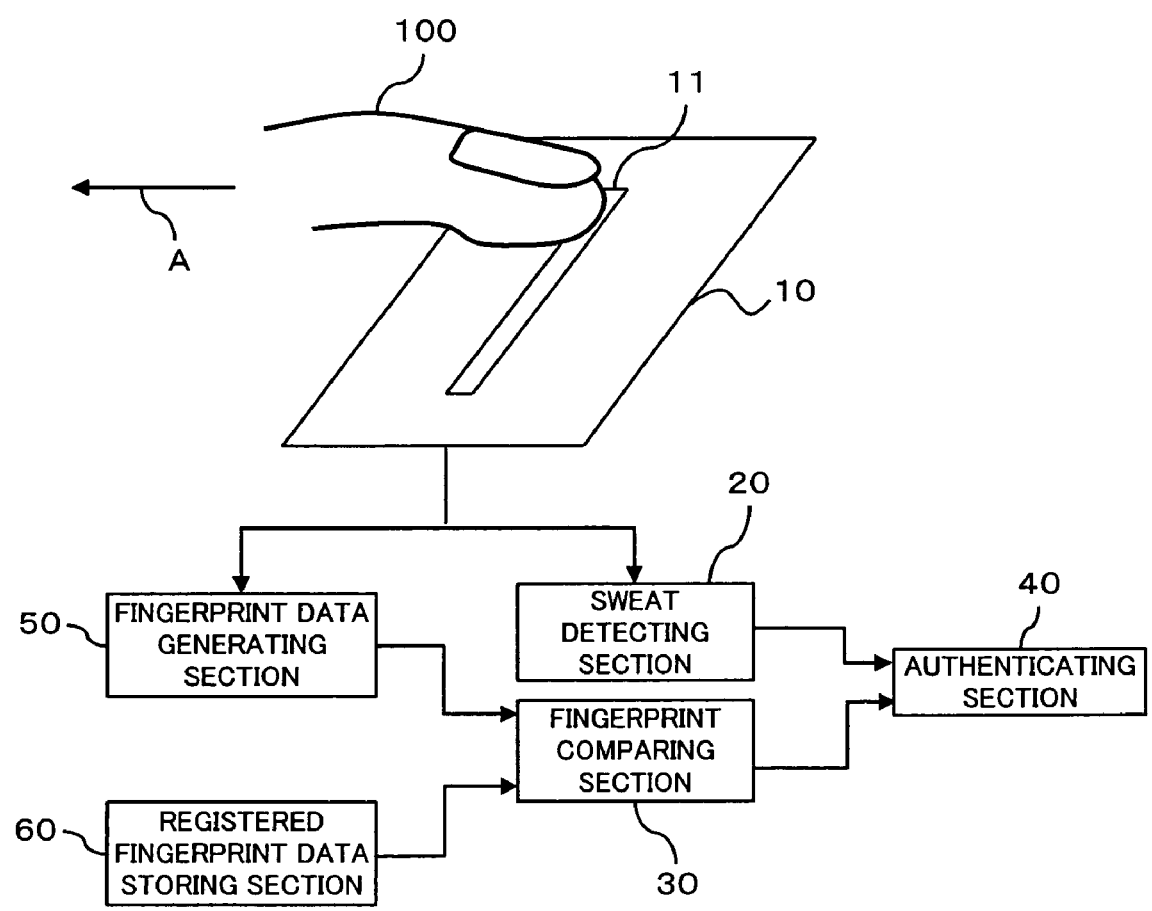
FIG. 1 is a block diagram illustrating a configuration of an authenticating apparatus having a living-body detecting function as one embodiment of the present invention.

FIG. 1 is a block diagram illustrating a configuration of an authenticating apparatus having a living-body detecting function as one embodiment of the present invention. The authenticating apparatus of this embodiment to be illustrated in this FIG. 1, which is for employing a fingerprint (biometric information) of a person to be authenticated, thereby to authenticate this person, comprises a capacitance and sweep type fingerprint sensor (image obtaining means) 10, a sweat detecting section (secretion product detecting means) 20, a fingerprint comparing section (comparing means) 30, an authenticating section (authenticating means) 40, a fingerprint data generating section 50, and a registered fingerprint data storing section 60.

The capacitance and sweep type fingerprint sensor (image obtaining means) 10 is for continuously obtaining images of an integument surface of a person to be authenticated, which moves while touching an obtaining plane (a sensor plane) 11, and more specifically, for, while moving a finger 100 of the person to be authenticated relatively to the obtaining plane 11, obtaining partial images of the fingerprint of its finger 100 continuously.

Herein, the so-called fingerprint, which was formed on an integument of the person to be authenticated (finger; subject), is a pattern, which is comprised of ridges (contact part), which can touch the obtaining plane 11, and valleys (non-contact part/gap part), which do not touch the obtaining plane 11. The fingerprint sensor 10 utilizes the fact that a difference of the detection sensitivity exists between the ridge part, which touches the obtaining plane 11, and the valley part, which does not touch the obtaining plane 11, thereby to obtain the fingerprint image as a multi-level image. In the capacitance type sensor, brightness differs responding to a distance from the sensor, normally, the ridge part having a short distance to the sensor is displayed in low brightness, and the valley part having a comparatively long distance to the sensor is displayed in high brightness.

At this time, a large number of sweat glands (exocrine glands) open on the surface (ridge) of the finger 100, being a living body, and the secretion products such as sweat, sebum, and vapor are secreted from these sweat glands at any time. For this, when the finger 100 is moved/caused to touch the obtaining plane 11 for purpose of obtaining the fingerprint image, the secretion products from the sweat glands adhere to the obtaining plane 11 without fail so long as its finger is a living body. The fingerprint sensor 10 translates the secretion products, which adhere to the obtaining plane 11 as described above, into images similarly to the ridge part, and obtains them as a low-brightness pattern in the above-mentioned partial images.

By the way, normally, a general fingerprint sensor for obtaining the fingerprint image from the person to be authenticated has a sensor plane (obtaining plane) larger than the size of the finger. However, in recent years, so as to mount the fingerprint sensor on the small-sized information appliances such as the mobile telephone or the PDA, the size of the sensor plane has been made smaller than the size of the finger to integrate a plurality of the partial images obtained continuously through its sensor plane for obtaining the image of the entirety of the fingerprint. The capacitance and sweep type fingerprint sensor 10 to be employed in this embodiment, which is a fingerprint sensor responding to such a situation, is sufficiently shorter in length than the finger 100, and has a small-area and rectangular obtaining plane (sensor plane/imaging plane) 11 as shown in FIG. 1.

And, the fingerprint sensor 10 is adapted to continuously obtain a plurality of the partial images relating to the fingerprint of the finger 100 while the finger 100 is moved to the obtaining plane 11, or while the obtaining plane 11 (fingerprint sensor 10) is moved to the finger 100, and the fingerprint data generating section 50 is adapted to reconstruct the entirety of the fingerprint image of the finger 100 from a plurality of the obtained partial images. A relative movement of the finger 100 to the obtaining plane 11 as described above is called a sweep.

The fingerprint data generating section 50 reconstructs the entirety of the fingerprint image as described above, and extracts/generates information of minutiae (bifurcations or end-points of the ridge) as fingerprint data (obtained characteristic information of the person to be authenticated) necessary for comparison from its fingerprint image.

On the other hand, the sweat detecting section (secretion product detecting means) 20, which is for detecting existence of the secretion product to be secreted from the exocrine gland (sweat gland) of the finger 100, based upon a plurality of the partial images obtained continuously by the fingerprint sensor 10, calculates a weighted average image of the above-mentioned plurality of the partial images, and detects existence of the secretion product, based upon a temporal change in the calculated weighted average image. In a case where the capacitance type sensor was employed, the brightness value of the ridge or the secretion product becomes lower than that of the circumference in the weighted average image which was calculated, whereby it is defined that the lower the brightness of the image is, the higher the sensitivity to the secretion product is. In a case where the optical sensor was employed, the brightness value of the ridge or the secretion product becomes higher than that of the circumference, whereby it is defined that the higher the brightness of the image is, the higher the sensitivity to the secretion product is. At this time, the sweat detecting section 20 of this embodiment recognizes a part in which a change from a high sensitivity value to a low sensitivity value with a lapse of time is slow as compared with that of the circumference, in the weighted average image which was calculated, as a part to which the secretion product adheres, in the obtaining plane 11, and detects existence of the secretion product. Additionally, sweat, sebum, vapor, etc. are considered as the secretion products as described above; however the sweat is represented herein, and hereinafter, the secretion product is described as "sweat".

Figure 2A:
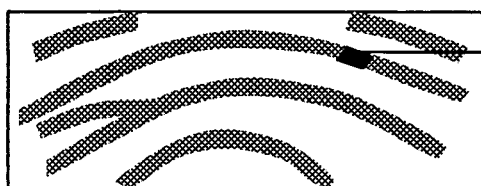
FIG. 2(A) to FIG. 2(D) are all views for explaining the principle of a living-body detecting technique (sweat detecting technique) in this embodiment.
Figure 2B:
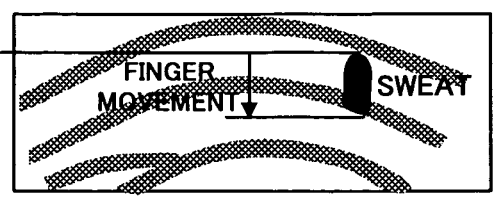
Figure 2C:
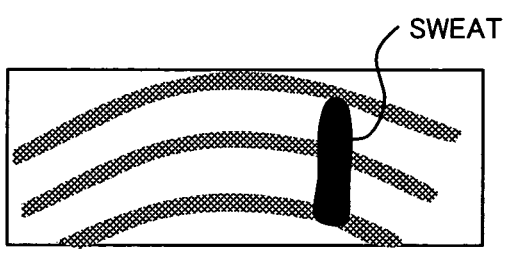
Figure 2D:
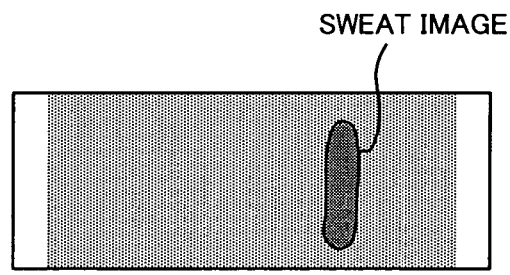
Figure 3:
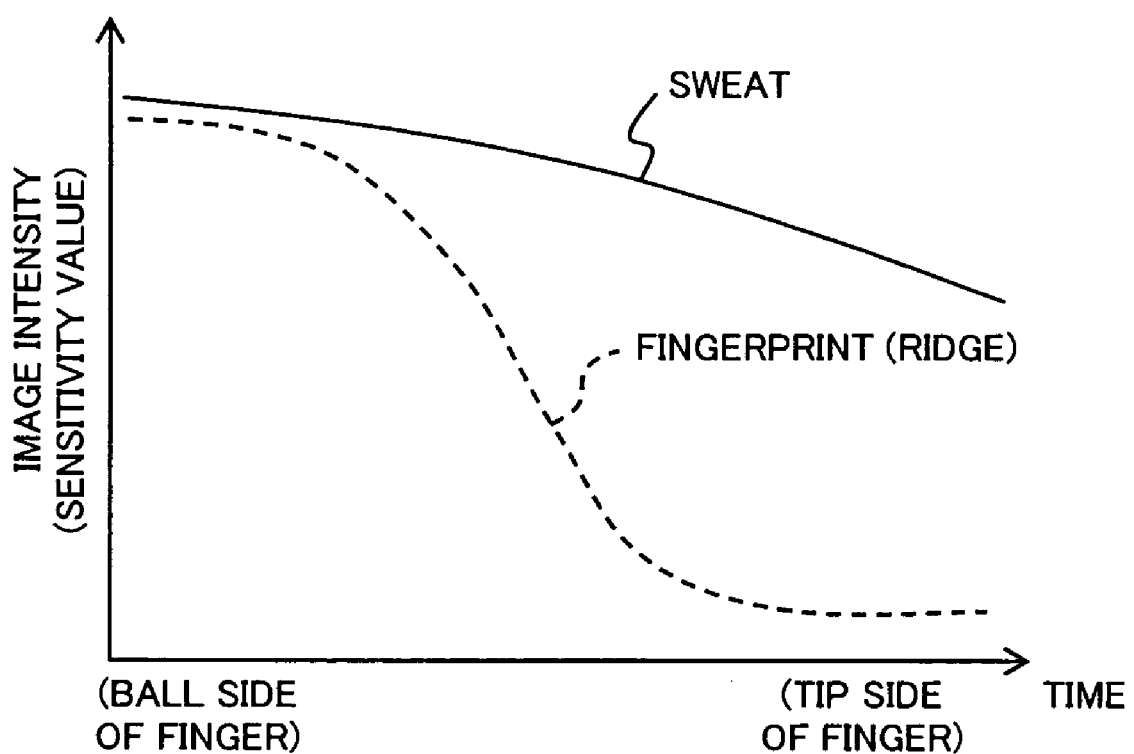
FIG. 3 is a graph illustrating a temporal change in an image intensity (sensitivity value) of a fingerprint and sweat, which are obtained by a sweep type fingerprint sensor, for purpose of explaining the principle of the living-body detecting technique (sweat detecting technique) in this embodiment.

The principle of the sweat detecting technique (living-body detecting technique) by the sweat detecting section 20 of this embodiment will be explained herein while a reference is made to FIG. 2(A) to FIG. 2(D) and FIG. 3. Additionally, FIG. 2(A) to FIG. 2(C) are views illustrating examples of the partial images which were imaged by the fingerprint sensor 10 at the time of T, T+t, and T+k (k>t>0) respectively, and FIG. 2(D) is a view illustrating the weighted average image (that is, the weighted average image of the partial images obtained at the time of T to T+k) of the partial images shown in FIG. 2(A) to FIG. 2(C). Also, FIG. 3 is a graph illustrating a temporal change in the image intensity (sensitivity value) of the fingerprint and the sweat, which is obtained by the fingerprint sensor 10.

In order to detect a pattern, which is not a moving image like the ridge, as sweat etc. which was secreted from the living body (finger 100) and adhered to the obtaining plane 11, the sweat detecting section 20 employs the weighted average image of a plurality of the partial images, thereby to separate the fingerprint image (ridge image) from the sweat image in a plurality of the partial images of the fingerprint which were imaged by the fingerprint sensor 10. In this embodiment, in a case where the sweat image (secretion product) was separated by the sweat detecting section 20 and existence of the sweat image was detected/confirmed, it is detected that the finger of the person to be authenticated is a living body.

In obtaining the fingerprint image with the fingerprint sensor 10 of this embodiment, the finger 100 moves with time, so the ridge image changes its position every moment as shown in FIG. 2(A) to FIG. 2(C). For this, the possibility that the identical pattern (ridge image) comes out at the identical position of each partial image is very low, so the image, which corresponds to the ridge, is averaged in the weighted average image (superposed image) obtained from a plurality of the partial images as shown in FIG. 2(D), and image information (image intensity) of the ridge results in being thinned down.

On the other hand, once sweat (or sebum, vapor, etc.), being a secretion product, adheres to the obtaining plane 11, accompanied by a sweep operation, sweat is dragged, and spreads in its sweep direction as shown in FIG. 2(A) to FIG. 2(C). And, until its sweat is swept off by the finger 100, or evaporates from the obtaining plane 11, the pattern (sweat image) due to sweat remains as it came out at the identical position of each partial image. For this, as shown in FIG. 2(D), the image, which corresponds to sweat, results in being emphasized as compared with that of the circumference in the weighted average image (superposed image) obtained from a plurality of the partial images.

However, as described above, sweat etc., which adheres to the obtaining plane 11, comes not to be translated into images because it is swept off by the finger 100, accompanied by the sweep operation, or evaporates from the obtaining plane 11 as time elapses, whereby information of the old images becomes meaningless. For this, so as to employ new partial images at any time to calculate a weighted average image G(i,j,K) having the non-moving pattern (i.e. sweat image) reflected, for example, the following equation (1) is employed.

$$G(i,j,K) = wF(i,j,K-k) + (1-w)G(i,j,K-1) \quad (1)$$

where 0<w<1.

The image, which was obtained by multiplying an input image F(i,j,K−k) by a weight w(k) to calculate the weighted average image G(i,j,K) in regard to n sheets of the partial images employing such an equation (1), is regard as the non-moving pattern (i.e. sweat image), where n may be defined as the number of images to be acquired within a predetermined time, or may be defined as the number of images acquired within a predetermined distance. Also, the weight w(k) is set so that the newer the partial image is (i.e. the smaller k is), the larger it becomes.

And, the sweat detecting section 20 of this embodiment recognizes a part in which a change from a low sensitivity value to a high sensitivity value occurs as time elapses, in the weighted average image G(i,j,K) calculated with the equation (1), as a part to which sweat etc. adheres, in the obtaining plane 11, and detects existence of the secretion product.

At this time, so as to reduce the calculation time and the memory capacity to be used, the weighted average image G(i,j,K) may be calculated by employing, for example, the following equation (2) instead of the above equation (1).

$$G(i,j,K) = \Sigma\{w(k) \cdot F(i,j,K-1) + G(i,j,K-1)\} \quad (2)$$

Additionally, in employing the capacitance and sweep type fingerprint sensor 10 to obtain the fingerprint image, normally, like an arrow A shown in FIG. 1, the finger 100 is caused to move from its ball part toward the fingertip. As a rule, there is a tendency that the ridge exists almost in parallel to the sweep direction (the direction of the arrow A of FIG. 1) in the part of the ball of the finger 100, and the ridge exists in an intersecting direction to the sweep direction in the tip part of the finger 100.

Accordingly, in a case where the average image was calculated as described above, as shown in FIG. 3, the image intensity of the ridge is extremely high in the average image of the ball side of the finger 100 and the intensity of the sweat image is low, whereby it is difficult to separate the sweat image from the partial images.

On the other hand, as shown in FIG. 3, the image intensity of the ridge becomes low and the intensity of the sweat image becomes high in the tip side of the finger 100, whereby it becomes possible to easily separate/recognize the sweat image from the partial images. For this, in the sweat detecting section 20 of this embodiment, a partial image group of the fingertip side, which does not receive an influence of the ridge image, is preferably employed to calculate the weighted average image, and to detect existence of sweat (secretion product).

The fingerprint comparing section (comparing means) 30 is for comparing obtained fingerprint data (obtained characteristic information of the person to be authenticated), which was obtained by the fingerprint data generating section 50, with registered fingerprint data (registered characteristic information) of the person to be authenticated, which was pre-registered in the registered finger data storing section 60, thereby to determine whether or not this obtained fingerprint data coincides with the registered fingerprint data.

In a case where the sweat detecting section 20 detected existence of sweat etc. (secretion product) and yet the comparing section 30 determined that the obtained fingerprint data coincided with the registered fingerprint data, the authenticating section (authenticating means) 40 authenticates the person. That is, in a case where existence of the secretion product such as sweat etc. was not detected by the sweat detecting section 20 (in a case where it is impossible to confirm that the subject, which touched the obtaining plane 11, is a living body), the authenticating section 40 of this embodiment makes it a rule to output failure in authentication (non-authentication information that the person to be authenticated is not a person who has performed the registration of the registered fingerprint data) at any time regardless of a fingerprint comparison result by the comparing section 30.

Additionally, the forgoing authenticating apparatus of this embodiment is realized by attaching the capacitance and sweep type fingerprint sensor 10, for example, to a personal computer. At this moment, functions as the sweat detecting section 20, the fingerprint comparing section 30, the authenticating section 40, and the fingerprint data generating section 50 are realized by executing a predetermined program with a CPU (Central Processing Unit) within the personal computer, and a function as the registered fingerprint data storing section 60 is realized with a memory device (for example, a hard disk, a RAM, a ROM, etc.) within the personal computer, a memory device etc. externally attached to the personal computer, or the like.

Next, an operation of the authenticating apparatus of this embodiment configured as described above will be explained according to a flowchart (steps S10 to S100) shown in FIG. 4.

Figure 4:
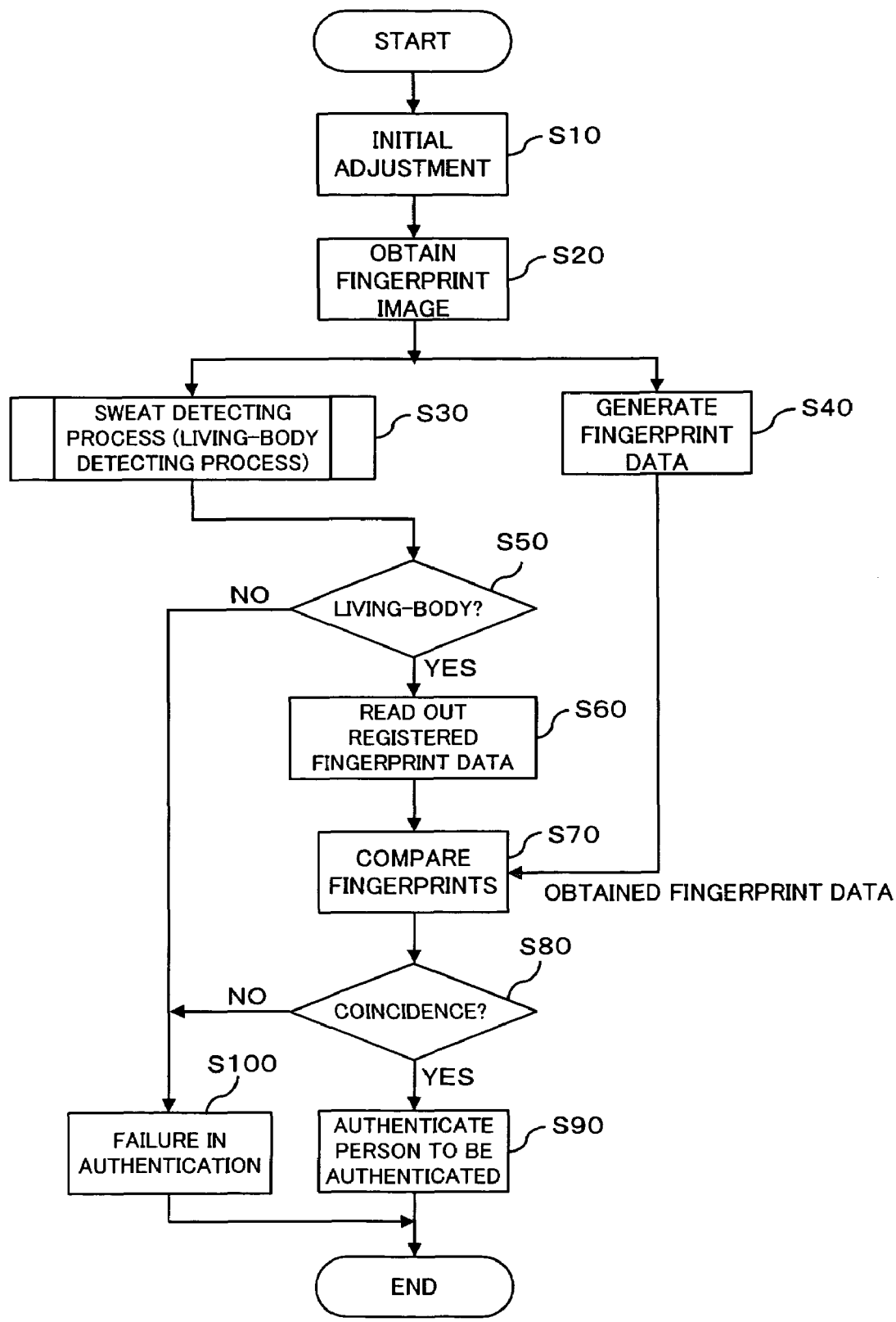
FIG. 4 is a flowchart for explaining an operation of an authenticating apparatus of this embodiment.

As shown in FIG. 4, at first, an initial adjustment of the fingerprint sensor 10 is made (step S10). As this initial adjustment, for example, a gain adjustment etc. is made for suitably detecting finger information. Thereafter, the person to be authenticated moves the finger (subject) 100 in a predetermined direction while causing it to touch the obtaining plane 11 of the fingerprint sensor 10, and the fingerprint sensor 10 continuously obtains the fingerprint images of the finger 100 which moves while touching the obtaining plane 11 (step S20). At this time, if the subject is a living body, the secretion product such as sweat etc. to be secreted inevitably from the exocrine gland such as the sweat gland etc. adheres to the obtaining plane 11, and the image of the secretion product which adheres hereto is imaged together with the partial images of the fingerprint, and is contained in the partial images.

And, the sweat detecting section 20 executes a living-body detecting process (sweat detecting process: step S30) to be described later, and detects whether or not sweat to be secreted from the exocrine gland (sweat gland) of the finger 100 exists, based upon the partial images obtained continuously by the fingerprint sensor 10.

Figure 5:
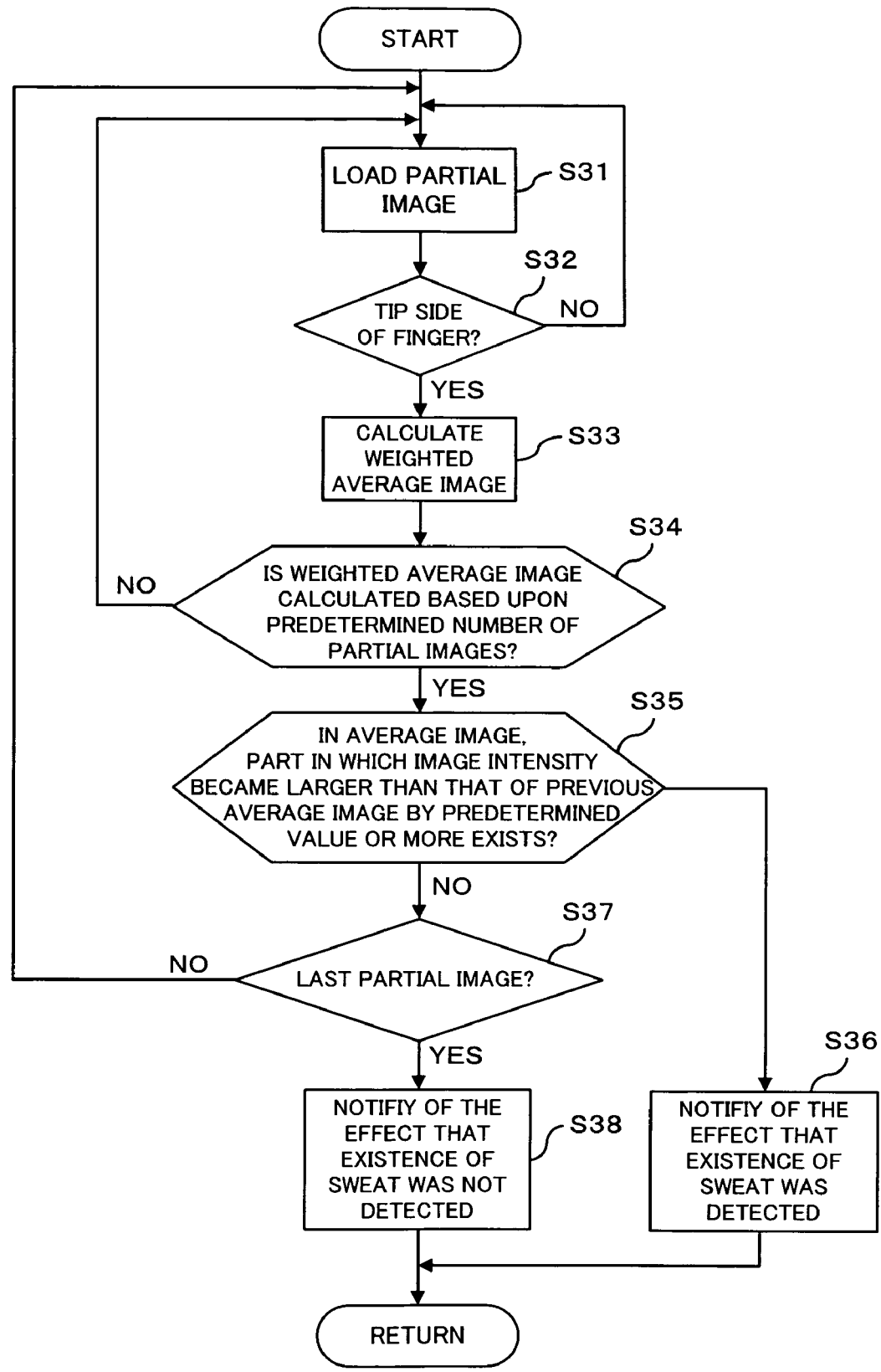
FIG. 5 is a flowchart for explaining a living-body detecting procedure (an operation of a sweat detecting section) in this embodiment.

An operation (living-body detecting process/sweat detecting process) of the sweat detecting section 20 will be explained herein while a reference is made to a flowchart (steps S31 to S38) shown in FIG. 5.

The sweat detecting section 20 loads the partial images, which were obtained by the fingerprint sensor 10, one by one (step S31), and determines whether or not its partial images belong to the tip side of the finger 100 (step S32) The reason why such a determination is made is that, as described above while a reference was made to FIG. 3, so as to securely detect existence of sweat (discretion product), it is desirable to employ the partial images of the fingertip side, which do not receive an influence of the ridge image. Additionally, the determination in the step S32 is made, for example, by determining whether or not a lapse time after starting the fingerprint acquisition reached a predetermined time, or whether or not the number of the obtained partial images reached a predetermined number.

In a case where the partial images did not belong to the tip side of the finger 100 (NO route in the step S32), the operation returns to the step S31 to load the next partial images, and to make a determination by the step S32. On the other hand, in a case where the partial images belonged to the tip side of the finger 100 (YES route in the step S32), the above equation (1) or the above equation (2) is employed to calculate the weighted average image (step S33).

And, it is determined whether or not the weighted average images were calculated based upon a predetermined number (n in the above equations (1) and (2)) of the partial images (step S34), and in a case where the number of the partial images employed for the calculation did not reach a predetermined number (NO route in the step S34), the operation returns to the step S31 to load the next partial images, and to perform the process (steps S32 to S34) similar to the forgoing.

In a case where the number of the partial images employed for the calculation in the step S33 reached a predetermined number (YES route in the step S34), it is determined whether or not a part (a part in which a change from a low sensitivity value to a high sensitivity value occurred), in which the image intensity (sensitivity value) became larger than that of the weighted average image obtained last time, exists in the weighted average image obtained this time (step S35).

Such a change part is a part corresponding to the image (sweat image) which was imaged at the moment that the secretion product such as sweat etc. adhered to the obtaining plane 11, as explained while a reference was made to FIG. 2(A) to FIG. 2(D). Accordingly, to make an existence determination of the above-mentioned change part is to determine whether or not the secretion product such as sweat etc. is secreted from the subject (finger 100), that is, to determine whether or not the subject (finger 100) is a living body.

In a case where the above-mentioned change part exists (YES route in the step S35), the sweat detecting section 20 notifies the authenticating section 40 of the effect that existence of sweat was detected (that is, the effect that finger 100 of the subject is a living body) (step S36).

On the other hand, in a case where the above-mentioned change part does not exist (NO route in the step S35), the sweat detecting section 20 determines whether or not the last partial image was loaded (step S37), in a case where the partial images were not loaded to the last (NO route in the step S37), the operation returns to the step S31 to repeatedly execute the processes (steps S31 to S37) similar to the foregoing. Also, in a case where the partial images were loaded to the last (YES route in the step S37), the sweat detecting section 20 notified the authenticating section 40 of the effect that it was impossible to detect existence of sweat (that is, the effect that the finger 100 of the subject is not a living body) (step S38).

In parallel to execution of the sweat detecting process as described above in the sweat detecting section 20, in the fingerprint data generating section 50, the entirety of the fingerprint image is reconstructed from the partial images obtained continuously by the fingerprint sensor 10, and information of the characteristic points (the diverging point or the end point of the ridge) is extracted/generated as fingerprint data (obtained characteristic information of the person to be authenticated) necessary for comparison from its fingerprint image (step S40).

And, the authentication section 40 recognizes whether or not the subject (finger 100) is a living body, based upon the notification from the sweat detecting section 20 (step S50). In a case where the notification saying the effect that it was impossible to detect existence of sweat was received from the sweat detecting section 20, it is recognized that the subject (finger 100) is not a living body (NO route in the step S50), and the effect that the authentication failed (non-authentication information that the person is not authenticated) is notified to the person, or a system manager etc. (step S100). At this time, the effect that the subject (finger 100) was not a living body, that is, the effect that the forged fingerprint was used may be notified to the system manager etc.

In a case where the notification saying the effect that existence of sweat was detected was received from the sweat detecting section 20, itis recognized that the subject (finger 100) is a living body (YES route in the step S50) and the fingerprint comparison is made by the fingerprint comparing section 30. That is, in the fingerprint comparing section 30, the registered fingerprint data of the person to be authenticated was read out from the registered fingerprint data storing section 60 (step S60), this registered fingerprint data is compared with the obtained fingerprint data from the fingerprint data generating section 50 (step S40) (step S70), and it is determined whether or not this obtained fingerprint data coincides with the registered fingerprint data (step S80).

In a case where these kinds of the fingerprint data coincided (YES route in the step S80), the person is authenticated, and its effect is notified to the person, or the system manager etc. (step S90). Also, in a case where the obtained fingerprint data did not coincide with the registered fingerprint data (NO route in the step S80), the effect that the authentication failed (non-authentication information that the person is not authenticated) is notified to the person, or the system manager etc. (step S100).

In accordance with one embodiment of the present invention, as described above, attention is paid to the fact that no sweat gland (exocrine gland), which secretes sweat, exists in the non-living body such as the artificial finger made of gummi, presence of sweat which, as long as the living body is concerned, is inevitably secreted from the sweat gland of its integument, is investigated, based upon a plurality of the images obtained continuously by the capacitance and sweep type fingerprint sensor 10, and it is detected that the subject (finger 100 of the person to be authenticated) is a living body in a case where existence of sweat was detected. This makes it possible to securely detect whether or not the subject is a living body, thus allowing the non-living body such as, for example, the artificial finger made of gummi to be identified securely.

Also, in acquiring the fingerprint image from the person to be authenticated for purposes of employing the fingerprint, thereby to make personal authentication like this embodiment, presence of sweat is investigated, and in a case where existence of sweat was detected and yet it was determined that the comparison result coincided, the person is authenticated. Accordingly, it can be securely detected whether or not the subject (finger 100), being an object of biometric information acquisition, is a living body, for example, the artificial finger made of gummi is securely identified, the unjust utilization by an action of successful impersonation employing the forged fingerprint is securely excluded, and the personal authentication having a higher reliability can be realized.

At this time, in accordance with the authenticating apparatus of this embodiment, the living-body detection can be made by employing the capacitance and sweep type fingerprint sensor 10 for obtaining the fingerprint image as it stands, whereby there is no necessity for newly adding appliances (hardware) for making the living-body detection, so the living-body detecting function can be realized without incurring an increase in facility cost etc.

Additionally, the present invention is not restricted to the embodiments described above; however various modifications may be made without departing from the sprit of the inventive concept as defined by the appended claims and their equivalents.

For example, in the foregoing embodiments, a case was explained where the subject was a finger of a human being, and the fingerprint image was obtained as biometric information; however the present invention is not restricted hereto, also in a case where a palm print image or a blood vessel pattern image, etc. is obtained as biometric information from the palm as a subject, the present invention applies similarly to the foregoing, and the operational effect similar to the foregoing can be obtained. Also, the present invention applies similarly to the foregoing also in case where a muzzle print image is obtained as biometric information from a muzzle of a cattle etc. as a subject, and the operational effect similar to the foregoing can be obtained.

Also, in the foregoing embodiments, a case was explained where the fingerprint sensor was of capacitance type; however the optical fingerprint sensor may be employed.

Further, in the foregoing embodiments, the sweep type fingerprint sensor having a small-area and rectangular obtaining plane was employed as the fingerprint sensor; however a general fingerprint sensor having an obtaining plane larger than the size of the finger may be employed. However, in this case, apart from obtaining the entirety of the fingerprint image with the finger caused to stand still, the finger is caused to move on the obtaining plane of the fingerprint sensor by an appropriate amount, thereby to detect existence of the secretion product such as sweat etc. similarly to the foregoing for making the living-body detection.

INDUSTRIAL APPLICABILITY

As mentioned above, in accordance with the present invention, presence is investigated of the secretion product which, as long as the living body is concerned, is inevitably secreted from the exocrine gland of its integument, based upon a plurality of the images obtained continuously by the image obtaining means, and it is detected that the subject is a living body in a case where existence of the secretion product was detected. This makes it possible to securely detect whether or not the subject is a living body, to securely identify the non-living body such as, for example, the artificial finger made of gummi, to securely exclude the unjust utilization by an action of successful impersonation employing the forged fingerprint, and to realize personal authentication having a higher reliability.

Accordingly, the present invention is preferred in applying to the authenticating apparatus for employing biometric information such as, for example, the fingerprint and the palm print, thereby to make personal authentication, and it is believed that its usefulness is extremely high.

What is claimed is:

1. A living-body detecting apparatus, comprising:
   an image obtaining means for continuously obtaining images of an integument surface of a subject, said subject moving while touching an obtaining plane; and
   a secretion product detecting means for detecting existence of a secretion product to be secreted from an exocrine gland of said integument directly onto the obtaining plane, based upon a plurality of the images obtained continuously by said image obtaining means.

2. The living-body detecting apparatus according to claim 1, wherein the above image obtaining means obtains a pattern formed on said integument surface together with said secretion product, which adheres to said obtaining plane, as an image of said integument surface, said pattern being comprised of ridges which can touch said obtaining plane, and valleys which do not touch said obtaining plane.

3. The living-body detecting apparatus according to claim 1, wherein said image obtaining means is a contact type semiconductor sensor, said contact type semiconductor sensor being typified by a capacitance type sensor.

4. The living-body detecting apparatus according to claim 1, wherein said image obtaining means is an optical sensor.

5. A living-body detecting apparatus, comprising:
an image obtaining means for continuously obtaining images of an integument surface of a subject, said subject moving while touching an obtaining plane; and
a secretion product detecting means for detecting existence of a secretion product to be secreted from an exocrine gland of said integument, based upon a plurality of the images obtained continuously by said image obtaining means,
wherein the above image obtaining means obtains a pattern formed on said integument surface together with said secretion product, which adheres to said obtaining plane, as an image of said integument surface, said pattern being comprised of ridges which can touch said obtaining plane, and valleys which do not touch said obtaining plane, and
said secretion product detecting means calculates a weighted average image of a plurality of the images to be obtained continuously by said image obtaining means and detects existence of said secretion product, based upon a temporal change in the calculated weighted average image.

6. The living-body detecting apparatus according to claim 5, wherein said secretion product detecting means recognizes a part in which a change from a low sensitivity value to a high sensitivity value occurs as time elapses, in said weighted average image, as a part to which said secretion product adheres, in said obtaining plane, thereby to detect existence of said secretion product.

7. A living-body detecting method, comprising:
obtaining continuously images of an integument surface of a subject by an image obtaining means, said subject moving while touching an obtaining plane of the image obtaining means; and
detecting a secretion product to be secreted from an exocrine gland of said integument directly onto the obtaining plane, based upon a plurality of the images obtained continuously.

8. The living-body detecting method according to claim 7, wherein a pattern formed on said integument is obtained together with said secretion product, which adheres to said obtaining plane, as an image of said integument surface in said obtaining continuously images, said pattern being comprised of ridges which can touch said obtaining plane, and valleys which do not touch said obtaining plane.

9. The living-body detecting method according to claim 7, wherein said image obtaining means is a contact type semiconductor sensor, said contact type semiconductor sensor being typified by a capacitance type sensor.

10. The living-body detecting method according to claim 7, wherein said image obtaining means is an optical sensor.

11. A living-body detecting method, comprising:
obtaining continuously images of an integument surface of a subject by an image obtaining means, said subject moving while touching an obtaining plane of the image obtaining means; and
detecting a secretion product to be secreted from an exocrine gland of said integument, based upon a plurality of the images obtained continuously,
wherein a pattern formed on said integument is obtained together with said secretion product, which adheres to said obtaining plane, as an image of said integument surface in said obtaining continuously images, said pattern being comprised of ridges which can touch said obtaining plane, and valleys which do not touch said obtaining plane, and
a weighted average image of a plurality of the images to be obtained continuously in said obtaining continuously images is calculated to detect existence of said secretion product, based upon a temporal change in the calculated weighted average image, in said detecting the secretion product.

12. The living-body detecting method according to claim 11, wherein a part in which a change from a low sensitivity value to a high sensitivity value occurs as time elapses, in said weighted average image, is recognized as a part to which said secretion product adheres, in said obtaining plane, thereby to detect existence of said secretion product in said detecting the secretion product.

13. An authenticating apparatus having a living-body detecting function, said apparatus comprising:
an image obtaining means for continuously obtaining images of an integument surface of a person to be authenticated, said integument surface moving while touching an obtaining plane;
a secretion product detecting means for detecting existence of a secretion product to be secreted from an exocrine gland of said integument, based upon a plurality of the images obtained continuously by said image obtaining means;
a comparing means for comparing obtained characteristic information of said person, said obtained characteristic information being obtained from a plurality of the images obtained continuously by said image obtaining means, with registered characteristic information of said person, said registered characteristic information being pre-registered, thereby to determine whether or not said obtained characteristic information coincides with said registered characteristic information; and
an authenticating means for, in a case where existence of said secretion product was detected by said secretion product detecting means and yet it was determined by said comparing means that said obtained characteristic information coincided with said registered characteristic information, authenticating said person.

14. The authenticating apparatus having a living-body detecting function according to claim 13, wherein said image obtaining means obtains a pattern formed on said integument surface together with said secretion product, which adheres to said obtaining plane, as an image of said integument surface, said pattern being comprised of ridges which can touch said obtaining plane, and valleys which do not touch said obtaining plane.

15. The authenticating apparatus having a living-body detecting function according to claim 14, wherein said secretion product detecting means calculates a weighted average image of a plurality of the images to be obtained continuously by said image obtaining means and detects existence of said secretion product, based upon a temporal change in the calculated weighted average image.

16. The authenticating apparatus having a living-body detecting function according to claim 15, wherein said secretion product detecting means recognizes a part in which a change from a low sensitivity value to a high sensitivity value occurs as time elapses, in said weighted average image, as a part to which said secretion product adheres, in said obtaining plane, thereby to detect existence of said secretion product.

17. The authenticating apparatus having a living-body detecting function according to claim 13, wherein said image obtaining means is a contact type semiconductor sensor, said contact type semiconductor sensor being typified by a capacitance type sensor.

18. The authenticating apparatus having a living-body detecting function according to claim 13, wherein said image obtaining means is an optical sensor.

19. A device for determining the life state of a subject of a biometric reading, the device comprising:
- an imaging device continuously obtaining images of an epidermis of a subject while the subject touches an input portion of the imaging device applying a secretion product from an exocrine gland of an integument directly onto an obtaining plane; and
- a comparator comparing the images continuously obtained by the imaging device with images with stored characteristic information of the subject, the comparison determining the existence of the secretion on the epidermis of the subject.

* * * * *